(12) United States Patent
Chen et al.

(10) Patent No.: US 10,359,036 B2
(45) Date of Patent: Jul. 23, 2019

(54) FLUID TRANSPORTATION DEVICE

(71) Applicant: Microjet Technology Co., Ltd., Hsinchu (TW)

(72) Inventors: Shou-Hung Chen, Hsinchu (TW); Shih-Chang Chen, Hsinchu (TW); Jia-Yu Liao, Hsinchu (TW); Mei-Yen Chen, Hsinchu (TW); Hsuan-Kai Chen, Hsinchu (TW); Yung-Lung Han, Hsinchu (TW); Chi-Feng Huang, Hsinchu (TW)

(73) Assignee: MICROJET TECHNOLOGY CO., LTD., Hsinchu (TW)

( * ) Notice: Subject to any disclaimer, the term of this patent is extended or adjusted under 35 U.S.C. 154(b) by 0 days.

(21) Appl. No.: 15/982,130

(22) Filed: May 17, 2018

(65) Prior Publication Data
US 2018/0347557 A1    Dec. 6, 2018

(30) Foreign Application Priority Data
May 31, 2017    (TW) .............................. 106117785 A

(51) Int. Cl.
*F04B 43/04*    (2006.01)
*F04B 43/00*    (2006.01)
(Continued)

(52) U.S. Cl.
CPC .......... *F04B 43/046* (2013.01); *F04B 43/009* (2013.01); *F04B 53/16* (2013.01);
(Continued)

(58) Field of Classification Search
CPC ...... F04B 43/046; F04B 53/16; F04B 43/009; F04B 53/22; F16K 7/12; F16K 99/0015
(Continued)

(56) References Cited

U.S. PATENT DOCUMENTS 4,181,477 A * 1/1980 Litt ..................... F04B 53/1092
                                                                137/512.15
7,299,815 B2 * 11/2007 Yamanishi ............ F04B 43/043
                                                                137/15.18
(Continued)

FOREIGN PATENT DOCUMENTS

CN    101581291 A    11/2009
CN    101582192 A *  11/2009
(Continued)

*Primary Examiner* — John Bastianelli
(74) *Attorney, Agent, or Firm* — Birch, Stewart, Kolasch & Birch, LLP

(57) ABSTRACT

A fluid transportation device includes a valve cover, a valve body, a valve membrane and a valve chamber seat. The valve cover has two openings. The valve body includes an inlet passage and an outlet passage. The valve membrane is arranged between the valve body and the valve chamber seat, having two valve plates respectively close an inlet valve channel and an outlet valve channel of the valve chamber seat. The valve chamber seat forms a pressure chamber which is sealed and covered by an actuator. The valve cover is sleeved on the valve body and tightly fitted to the inner wall of an outer sleeve to assemble the device, in which a first gasket is disposed between the valve body and the valve membrane, and a second gasket is disposed between the valve membrane and the valve chamber, by which sealing effect is improved and backflow is prevented.

10 Claims, 10 Drawing Sheets

(51) Int. Cl.
*F04B 53/22* (2006.01)
*F04B 53/16* (2006.01)
*F16K 99/00* (2006.01)
*F16K 7/12* (2006.01)

(52) U.S. Cl.
CPC ............... *F04B 53/22* (2013.01); *F16K 7/12* (2013.01); *F16K 99/0015* (2013.01)

(58) Field of Classification Search
USPC .................... 251/129.06; 417/413.2, 571
See application file for complete search history.

(56) References Cited

U.S. PATENT DOCUMENTS

| | | | | |
|---|---|---|---|---|
| 8,157,549 | B2* | 4/2012 | Chen | .................. F16K 99/0001 417/571 |
| 8,579,606 | B2* | 11/2013 | Chen | .................... F04B 43/043 137/856 |
| 2009/0060750 | A1* | 3/2009 | Chen | .................... F04B 43/043 417/26 |

FOREIGN PATENT DOCUMENTS

| | | |
|---|---|---|
| CN | 102444566 A | 5/2012 |
| CN | 206513532 U | 9/2017 |

\* cited by examiner

US 10,359,036 B2

FLUID TRANSPORTATION DEVICE

FIELD OF THE INVENTION

The present disclosure relates to a fluid transportation device, and more particularly to a fluid transportation device for use in a micro pump.

BACKGROUND OF THE INVENTION

Nowadays, fluid transportation devices used in many sectors such as pharmaceutical industries, computer techniques, printing industries, energy industries are developed toward miniaturization. The fluid transportation devices used in for example micro pumps, micro atomizers, printheads or industrial printers are very important components. Consequently, it is critical to improve the fluid transportation devices.

FIG. 10A is a schematic cross-sectional view illustrating a conventional micro pump in a non-actuation status. The conventional micro pump 8 comprises an inlet passage 83, a micro actuator 85, a transmission block 84, a diaphragm 82, a compression chamber 811, a substrate 81 and an outlet passage 86. The compression chamber 811 is defined between the diaphragm 82 and the substrate 81 for storing a fluid therein. Depending on the deformation amount of the diaphragm 82, the capacity of the compression chamber 811 is varied.

When a voltage is applied to electrodes disposed on opposite sides of the micro actuator 85, an electric field is generated. In response to the electric field, the micro actuator 85 is subjected to a downward deformation. Consequently, the micro actuator 85 is moved toward the diaphragm 82 and the compression chamber 811. Since the micro actuator 85 is disposed on the transmission block 84, the pushing force generated by the micro actuator 85 is transmitted to the diaphragm 82 through the transmission block 84. In response to the pushing force, the diaphragm 82 is subjected to a compressed deformation. Please refer to FIG. 10B. The fluid flows in the direction indicated as the arrow X. After the fluid is introduced into the inlet passage 83 and stored in the compression chamber 811, the fluid within the compression chamber 811 is pushed in response to the compressed deformation. Consequently, the fluid will flow to a predetermined vessel (not shown) through the outlet passage 86. In such way, the fluid can be continuously supplied.

FIG. 10C is a schematic top view of the micro pump shown in FIG. 10A. When the micro pump 8 is actuated, the fluid is transported in the direction indicated as the arrow Y. The micro pump 8 has an inlet flow amplifier 87 and an outlet flow amplifier 88. The inlet flow amplifier 87 and the outlet flow amplifier 88 are cone-shaped. The larger end of the inlet flow amplifier 87 is connected to the inlet passage 831. The smaller end of the inlet flow amplifier 87 is connected to the compression chamber 811. The outlet flow amplifier 88 is connected with the compression chamber 811 and the outlet passage 861. The larger end of the outlet flow amplifier 88 is connected to the compression chamber 811. The smaller end of the outlet flow amplifier 88 is connected to the outlet passage 861. In other words, the inlet flow amplifier 87 and the outlet flow amplifier 88 are connected to the two ends of the compression chamber 811. The inlet flow amplifier 87 and the outlet flow amplifier 88 tapered off in the same direction. Due to the different flow resistances at both ends of the flow amplifiers, and the volume expansion/compression of the compression chamber 811, a unidirectional net mass flow rate is rendered. That is, the fluid flows from the inlet passage 831 into the compression chamber 811 through the inlet flow amplifier 87 and then flows out of the outlet passage 861 through the outlet flow amplifier 88.

However, this valveless micro pump 8 still has some drawbacks. For example, a great amount of the fluid is readily returned back to the input channel when the micro pump is in the actuation status. For enhancing the net mass flow rate, the compression ratio of the compression chamber 811 should be increased for reaching a sufficient chamber pressure. Under this circumstance, a costly micro actuator 85 is required.

For solving the drawbacks of the conventional technologies, the present disclosure provides a fluid transportation device for maintaining the working performance and the flowrate of the fluid.

SUMMARY OF THE INVENTION

An object of the present disclosure provides a fluid transportation device for transferring the fluid at high efficiency with no backflow.

Another object of the present invention provides a fluid transportation device in which it is not necessary to use fastening elements (e.g., screws, nuts or bolts) to fasten and assemble the components of the fluid transportation device. Consequently, the assembly of the fluid transportation device is easier. Moreover, the efficacy of preventing fluid leakage is advantageously enhanced.

In accordance with an aspect of the present disclosure, there is provided a fluid transportation device. The fluid transportation device includes a valve cover, a valve body, a valve membrane, a first gasket, a valve chamber seat, a second gasket, an actuator and an outer sleeve. The valve cover includes a first opening and a second opening. A bottom edge of the valve cover has a chamfer. The valve body includes an inlet passage, an outlet passage, a first surface and a second surface. A protrusion platform is disposed on the second surface so that a first coupling plane is concavely formed on the second surface. The inlet passage and the outlet passage run through the first surface and the second surface. An inlet opening is formed in the second surface and in communication with the inlet passage. An outlet opening is formed in the second surface and in communication with the outlet passage. The valve membrane includes two valve plates, plural extension parts and plural hollow parts. The two valve plates have the same thickness. The plural extension parts are arranged around the valve plates for elastically supporting the valve plates. The hollow parts are arranged between the extension parts. The first gasket is attached on the first coupling plane to be arranged between the valve body and the valve membrane, and has a first perforation corresponding to the inlet opening. The valve chamber seat includes a third surface, a fourth surface, an inlet valve channel, an outlet valve channel and a pressure chamber. A protrusion platform is disposed on the third surface so that a second coupling plane is concavely formed on the third surface. The inlet valve channel and the outlet valve channel run through the third surface and the fourth surface. The two valve plates are supported by the inlet valve channel and the outlet valve channel. The pressure chamber is concavely formed on the fourth chamber and in communication with the inlet valve channel and the outlet valve channel. The second gasket is attached on the second coupling plane to be arranged between the valve membrane and the valve chamber seat, and has a second perforation corresponding to the outlet opening. The pressure chamber of the valve chamber seat is covered and sealed by the actuator. The outer sleeve has an inner wall surrounding an accommodation space with an annular protrusion structure formed on the bottom of the inner wall. The valve body, the first gasket, the valve membrane, the second gasket, the valve chamber seat and the actuator are sequentially stacked and accommodated within the accommodation space of the outer sleeve, being supported by the annular protrusion structure. The valve cover is introduced into the outer sleeve by the chamfer thereof in which the inlet passage and the outlet passage of the valve body are respectively penetrating through the first opening and the second opening of the valve cover, and the valve body is tightly fitted with the inner wall of the outer sleeve. Consequently, the valve cover, the first gasket, the valve membrane, the second gasket, the valve chamber seat and the actuator are securely fixed between the valve cover and the outer sleeve and assembly of the fluid transportation device is accomplished.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present disclosure provides a fluid transportation device. The fluid transportation device can be applied to many sectors such as pharmaceutical industries, computer techniques, printing industries or energy industries for transporting a fluid such as liquid.

Figure 1:
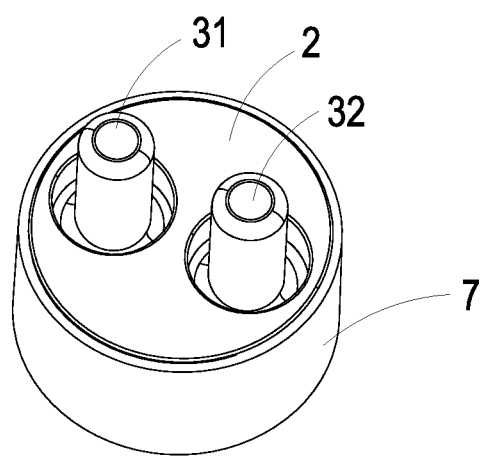
FIG. 1 is a schematic perspective view illustrating a fluid transportation device according to an embodiment of the present disclosure.
Figure 2A:
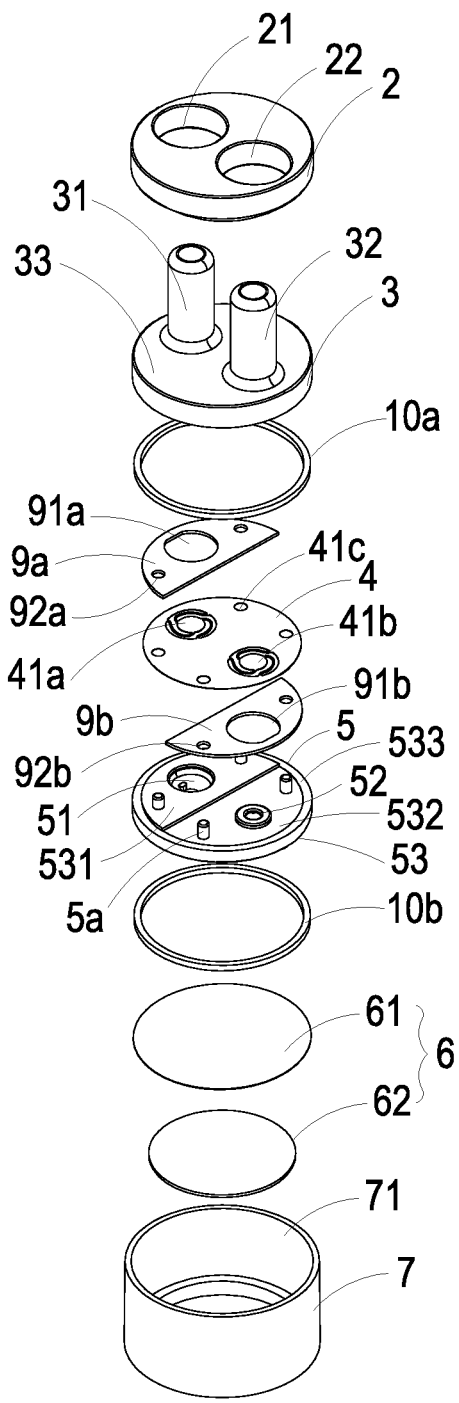
FIG. 2A is a schematic exploded view illustrating the fluid transportation device according to the embodiment of the present disclosure and taken along a front side.
Figure 2B:
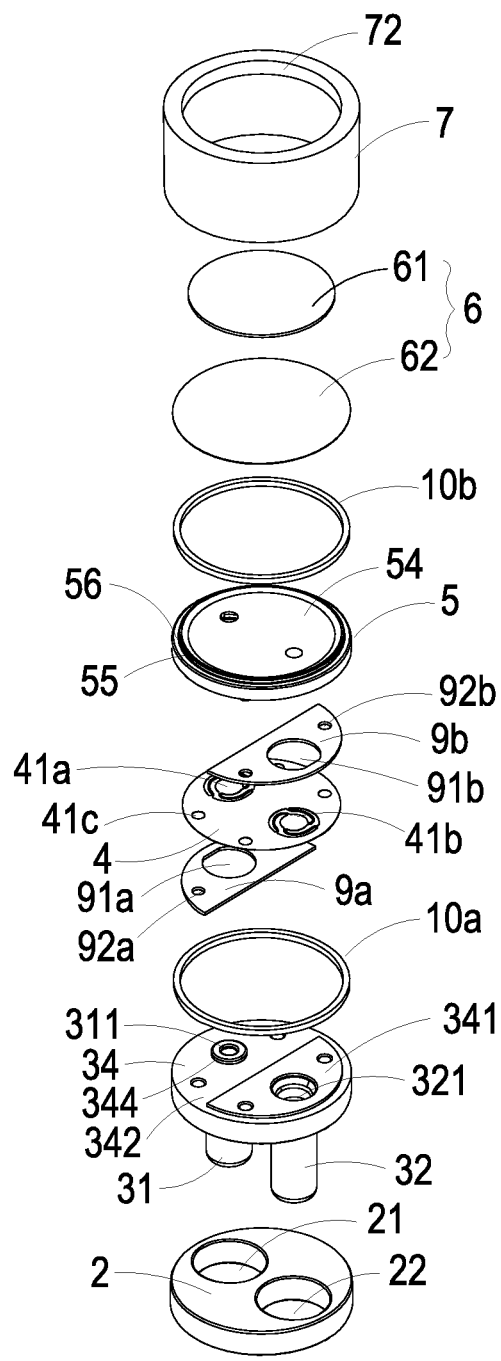
FIG. 2B is a schematic exploded view illustrating the fluid transportation device according to the embodiment of the present disclosure and taken along a rear side.
Figure 3A:
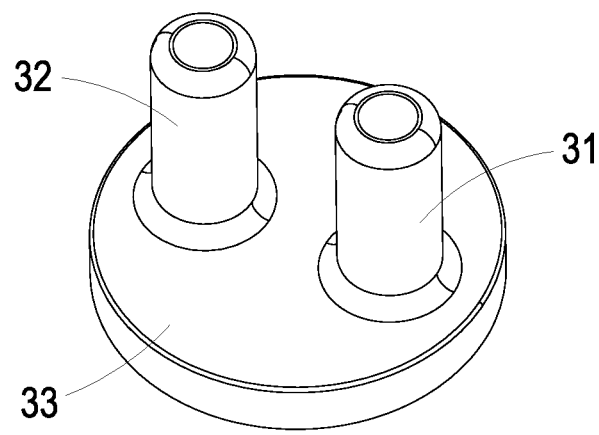
FIG. 3A is a schematic perspective view illustrating the valve body of the fluid transportation device according to the embodiment of the present disclosure and taken along the front side.
Figure 3B:
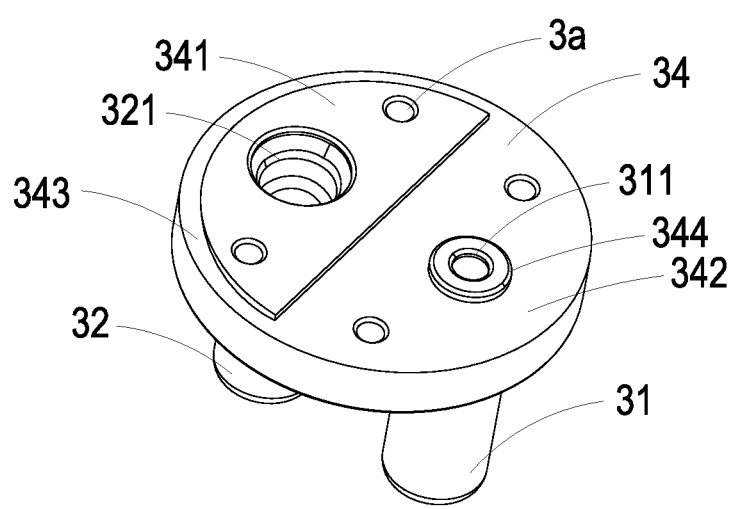
FIG. 3B is a schematic perspective view illustrating the valve body of the fluid transportation device according to the embodiment of the present disclosure and taken along the rear side.
Figure 4A:
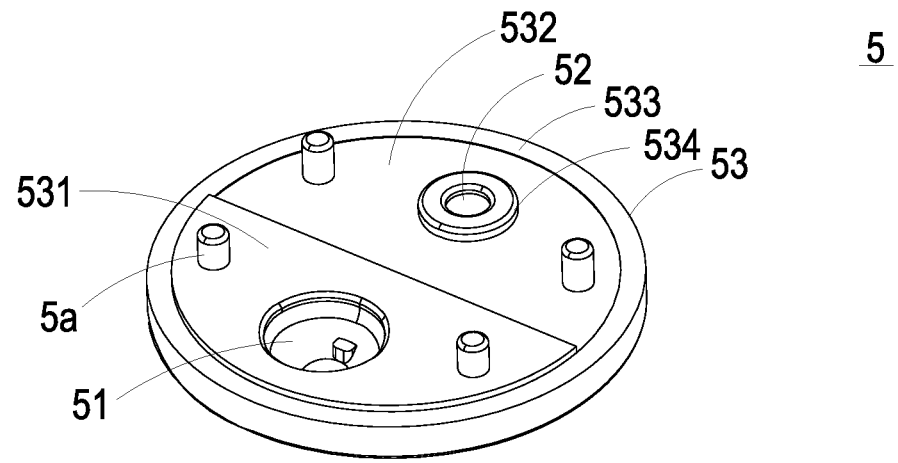
FIG. 4A is a schematic perspective view illustrating the valve chamber seat of the fluid transportation device according to the embodiment of the present disclosure and taken along the front side.
Figure 4B:
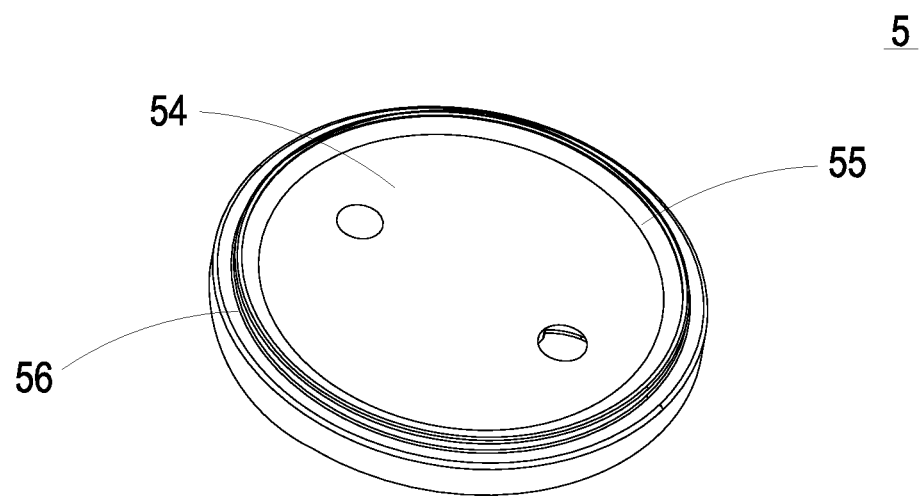
FIG. 4B is a schematic perspective view illustrating the valve chamber seat of the fluid transportation device according to the embodiment of the present disclosure and taken along the rear side.

Please refer to FIGS. 1, 2A and 2B. The fluid transportation device 1 comprises a valve cover 2, a valve body 3, a valve membrane 4, a valve chamber seat 5, an actuator 6, and an outer sleeve 7. For assembling the fluid transportation device 1, firstly, the valve body 3, the valve membrane 4, the valve chamber seat 5, and the actuator 6 are sequentially stacked in the outer sleeve 7, then the valve cover 2 is made tightly fitted in the outer sleeve 7 to position the components, thus the fluid transportation device 1 is assembled (see FIG. 1).

Please refer to FIGS. 1, 2A, 2B, 3A, 3B, 4A and 4B. The valve body 3 and the valve chamber seat 5 are the main components which guide fluid in and out of the fluid transportation device 1. The valve body 3 comprises an inlet passage 31 and an outlet passage 32, each of which runs through a first surface 33 and a second surface 34 of the valve body 3. An inlet opening 311 is formed in the second surface 34 and in communication with the inlet passage 31. An outlet opening 321 is formed in the second surface 34 and in communication with the outlet passage 32. A protrusion platform 341 is protruding from the second surface 34, so that a first coupling plane 342 is concavely formed on the second surface 34. In some embodiments, plural recesses 3a are formed on the second surface 34 of the valve body 3 (see FIG. 3B). A protrusion block 344 is protruding from the first coupling plane 342 of the second surface 34 and arranged around the inlet opening 311. Moreover, the second surface 34 further comprises a periphery annular region 343. The periphery annular region 343 is arranged around the protrusion platform 341 and the first coupling plane 342.

The valve chamber seat 5 comprises a third surface 53 and a fourth surface 54. Plural posts 5a are formed on the third surface 53 of the valve chamber seat 5 for being correspondingly engaged with the recesses 3a of the valve body 3, so that the valve chamber seat 5 can be fixed on the valve body 3. The valve chamber seat 5 further comprises an inlet valve channel 51 and an outlet valve channel 52, each of which runs through the third surface 53 and the fourth surface 54.

A protrusion platform 531, corresponding to the first coupling plane 342 on the second surface 34 of the valve body 3, is protruding from the third surface 53. Therefore, a second coupling plane 532 is concavely formed on the third surface 53. In addition, the fourth surface 54 of the valve chamber seat 5 is sunken where a pressure chamber 55 is formed. The pressure chamber 55 is in communication with the inlet valve channel 51 and the outlet valve channel 52. Moreover, a concave structure 56 is formed on the fourth surface 54, surrounding the sunken place where the pressure chamber 55 is formed. In some embodiments, the third surface 53 further comprises a periphery annular region 533. The periphery annular region 533 is arranged around the protrusion platform 531 and the second coupling plane 532. Moreover, a protrusion block 534 is protruding from the second coupling plane 532 of the third surface 53 and arranged around an opening of the outlet valve channel 52.

Figure 5:
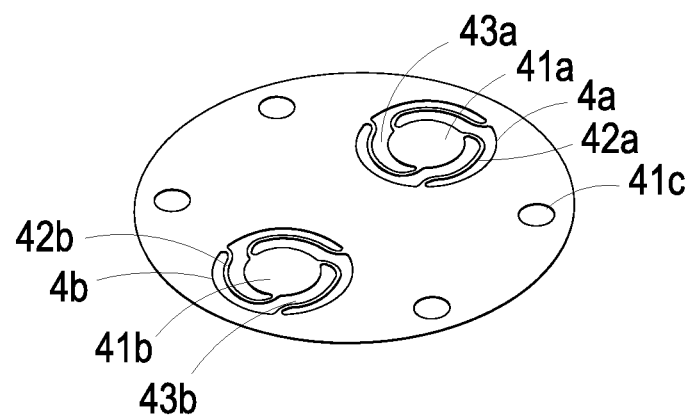
FIG. 5 is a schematic top view illustrating the valve membrane of the fluid transportation device according to the embodiment of the present disclosure.

Please refer to FIGS. 2A, 2B and 5. In an embodiment, the valve membrane 4 is made of polyimide (PI), and the valve membrane 4 is produced by a reactive ion etching (RIE) process, in which a photosensitive photoresist is applied to the valve structure on the polyimide layer and the pattern of the valve structure is exposed to light, then the polyimide layer uncovered by the photoresist is etched so that the valve structure of the valve membrane 4 is formed. The valve membrane 4 is a flat thin film structure. As shown in FIG. 5, the valve membrane 4 comprises two valve plates 41a and 41b at two perforated regions 4a and 4b, respectively. The two valve plates 41a and 41b have the same thickness. The valve membrane 4 further comprises plural extension parts 42a and 42b. The extension parts 42a and 42b are arranged around the valve plates 41a and 41b for elastically supporting the valve plates 41a and 41b. The valve membrane 4 further comprises plural hollow parts 43a and 43b each of which is formed between two adjacent extension parts. Any one of the valve plates 41a and 41b to which an external force is exerted is stretched out to a certain magnitude of displacement since it is elastically supported by the extension parts 42a and 42b, by which a valve structure is formed. Preferably but not exclusively, the valve plates 41a and 41b have circular shapes, rectangular shapes, square shapes or arbitrary shapes. The valve membrane 4 further comprises plural positioning holes 41c, so that the posts 5a of the valve chamber seat 5 can penetrate through the corresponding positioning holes 41c to position the valve membrane 4 on the valve chamber seat 5. Meanwhile, the inlet valve channel 51 and the outlet valve channel 52 are respectively covered and sealed by the valve plates 41a and 41b (see FIG. 8). In this embodiment, there are four posts 5a and four positioning holes 41c. It is noted that the number of the posts 5a and the number of the positioning holes 41c are not restricted.

Figure 8:
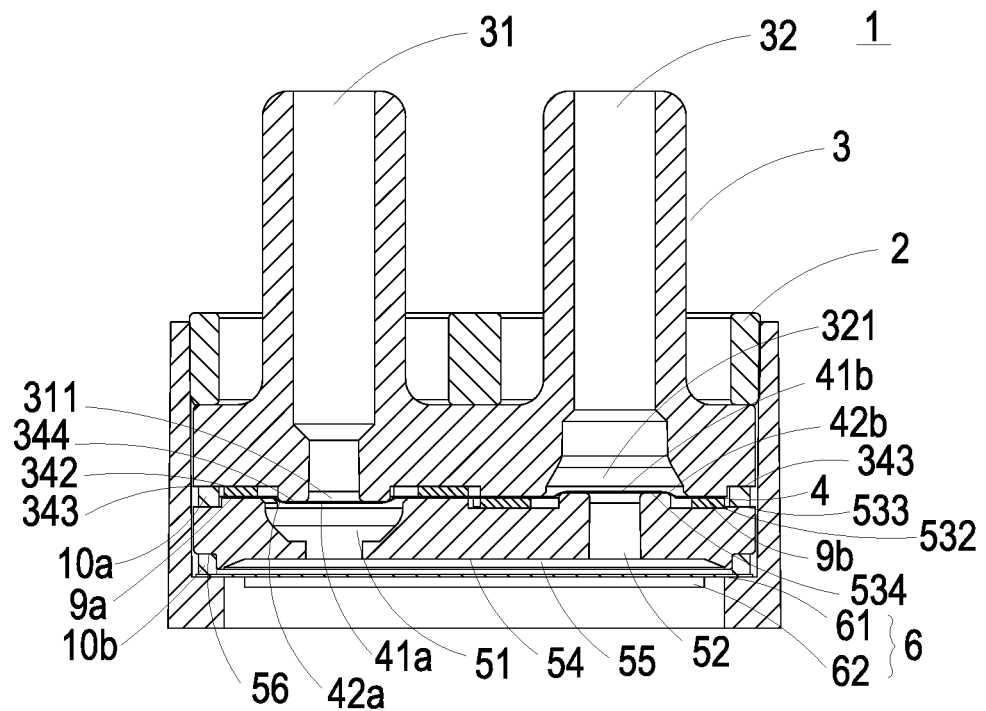
FIG. 8 is a schematic cross-sectional view illustrating the assembled structure of the fluid transportation device according to the embodiment of the present disclosure.

Please refer to FIGS. 2A, 2B and 8. The fluid transportation device 1 further comprises a first gasket 9a and a second gasket 9b. The first gasket 9a is attached on the first coupling plane 342 of the valve body 3 to be arranged between the valve body 3 and the valve membrane 4. Moreover, the first gasket 9a has a first perforation 91a corresponding to the inlet opening 311. The second gasket 9b is attached on the second coupling plane 532 of the valve chamber seat 5 to be arranged between the valve membrane 4 and the valve chamber seat 5. Moreover, the second gasket 9b has a second perforation 91b corresponding to the outlet opening 321. In some embodiments, the first gasket 9a further comprises plural first gasket positioning holes 92a, and the second gasket 9b further comprises plural second gasket positioning holes 92b. The posts 5a of the valve chamber seat 5 penetrates through the corresponding first gasket positioning holes 92a and the corresponding second gasket positioning holes 92b. Consequently, the first gasket 9a and the second gasket 9b are positioned on and assembled with the fluid transportation device 1.

Preferably, the first gasket 9a and the second gasket 9b are made of elastic material such as rubber. The shape of the first gasket 9a and the shape of the second gasket 9b match each other. Moreover, the shape of the valve membrane 4 matches the shape of the combination of the first gasket 9a and the second gasket 9b. In an embodiment, the first gasket 9a and the second gasket 9b have semicircular shapes, and the valve membrane 4 has a circular shape. It is noted that the shapes of the first gasket 9a, the second gasket 9b and the valve membrane 4 are not restricted. For example, in another embodiment, the first gasket 9a and the second gasket 9b have rectangular shapes, and the valve membrane 4 has a square shape that is the combination of the two rectangular shapes. The top surface of the protrusion platform 341 of the valve body 3, the second coupling plane 532 of the valve chamber seat 5 and the second gasket 9b have the same shapes and sizes and aligned with each other. Similarly, the first coupling plane 342 of the valve body 3, the protrusion platform 531 of the valve chamber seat 5 and the first gasket 9a have the same shapes and sizes and aligned with each other. In addition, the first gasket 9a and the second gasket 9b have the same thickness. The protrusion platform 341 of the valve body 3 and the protrusion platform 531 of the valve chamber seat 5 have the same height, which is identical or similar to the thickness of the first gasket 9a (or the second gasket 9b).

Please refer to FIGS. 2A, 2B and 8 again. When the valve body 3, the first gasket 9a, the valve membrane 4, the second gasket 9b and the valve chamber seat 5 are sequentially stacked on each other, an annular groove between the valve body 3 and the valve chamber seat 5 is formed by the periphery annular region 343 of the second surface 34 of the valve body 3 and the periphery annular region 533 of the third surface 53 of the valve chamber seat 5. A sealing ring 10a is trapped within the annular groove which improves the efficacy of preventing fluid leakage. Moreover, the first gasket 9a and the second gasket 9b also have the function of preventing fluid leakage. Consequently, the efficacy of preventing fluid leakage is enhanced. The inlet passage 31 of the valve body 3 is aligned with the inlet valve channel 51 of the valve chamber seat 5. The communication between the inlet passage 31 and the inlet valve channel 51 is selectively enabled or disabled through the valve plate 41a of the valve membrane 4. The outlet passage 32 of the valve body 3 is aligned with the outlet valve channel 52 of the valve chamber seat 5. The communication between the outlet passage 32 and the outlet valve channel 52 is selectively enabled or disabled through the valve plate 41b of the valve membrane 4. When the valve plate 41a of the valve membrane 4 is opened, the fluid introduced by the inlet passage 31 is transferred to the pressure chamber 55 through the inlet valve channel 51. When the valve plate 41b of the valve membrane 4 is opened, the fluid which has been transferred to the pressure chamber 55 flows through the outlet valve channel 52 and is discharged by the outlet passage 32.

Please refer to FIGS. 2A and 2B again. The actuator 6 comprises a vibration plate 61 and a piezoelectric element 62. The piezoelectric element 62 is attached on a surface of the vibration plate 61. In an embodiment, the vibration plate 61 is made of a metallic material, and the piezoelectric element 62 is made of a highly-piezoelectric material such as lead zirconate titanate (PZT) piezoelectric powder. The deformation of the piezoelectric element 62 occurs in response to an applied voltage, which makes the vibration plate 61 vibrates along the vertical direction in the reciprocating manner so that the operation of the fluid transportation device 1 is driven. The vibration plate 61 of the actuator 6 is disposed on the fourth surface 54 of the valve chamber seat 5 to cover and seal the pressure chamber 55. As mentioned above, the concave structure 56 is formed on the fourth surface 54 and arranged around the pressure chamber 55. For preventing fluid leakage from the edge of the pressure chamber 55, a sealing ring 10b is trapped in the concave structure 56.

As mentioned above, the valve body 3, the first gasket 9a, the valve membrane 4, the second gasket 9b, the valve chamber seat 5 and the actuator 6, are the main components of the fluid transportation device 1 which transfers fluid and guide fluid in and out of the fluid transportation device 1. In accordance with the feature of the present disclosure, the fluid transportation device 1 has a specified mechanism for assembling and positioning these components. That is, it is not necessary to use the fastening elements (e.g., screws, nuts or bolts) to fasten these components. Instead, the following paragraphs will explain how the present disclosure uses the valve cover 2 and the outer sleeve 7 to assemble and position the components, in which the valve body 3, the first gasket 9a, the valve membrane 4, the second gasket 9b, the valve chamber seat 5 and the actuator 6 are sequentially stacked and accommodated within the outer sleeve 7, and the valve cover 2 is directly tightly fitted into the outer sleeve 7 to position above-mentioned components.

Figure 6:
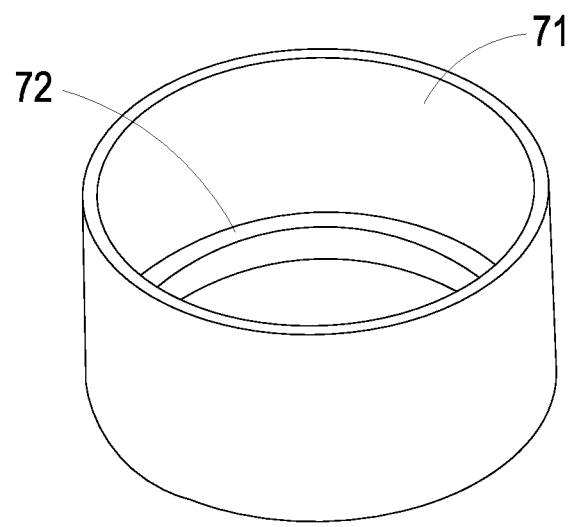
FIG. 6 is a schematic perspective view illustrating the outer sleeve of the fluid transportation device according to the embodiment of the present disclosure.
Figure 7A:
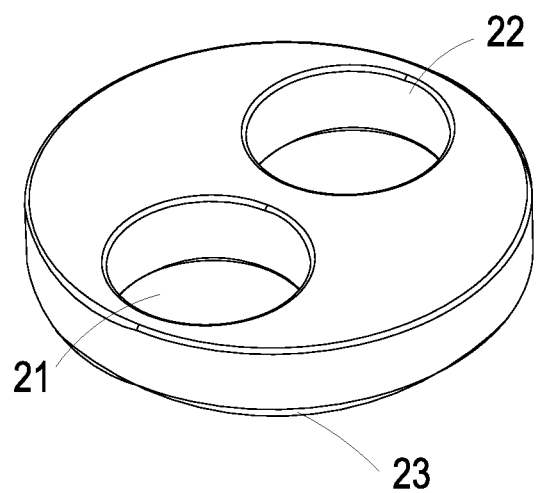
FIG. 7A is a schematic perspective view illustrating the valve cover of the fluid transportation device according to the embodiment of the present disclosure and taken along the front side.
Figure 7B:
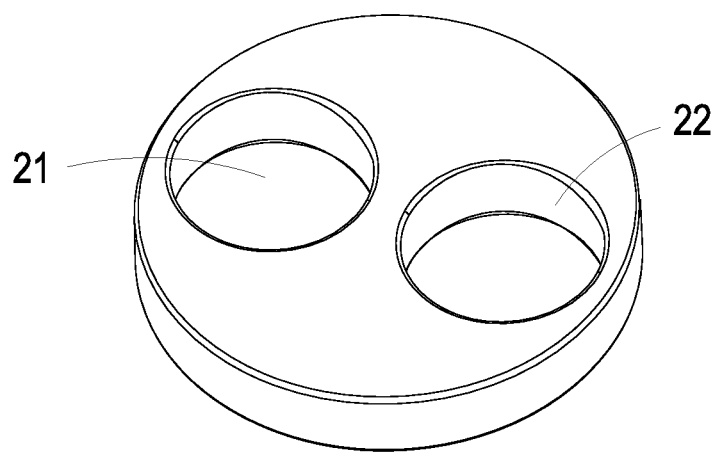
FIG. 7B is a schematic perspective view illustrating the valve cover of the fluid transportation device according to the embodiment of the present disclosure and taken along the rear side.

Please refer to FIGS. 2A, 2B and 6. The outer sleeve 7 is made of a metallic material. The outer sleeve 7 includes an inner wall 71 and an annular protrusion structure 72. The inner wall 71 is surrounding an accommodation space. The annular protrusion structure 72 is formed on the bottom of the inner wall 71. Please refer to FIG. 7A and FIG. 7B. The valve cover 2 is also made of a metallic material. The valve cover 2 comprises a first opening 21 and a second opening 22. The inlet passage 31 and the outlet passage 32 of the valve body 3 are penetrating through the first opening 21 and the second opening 22, respectively. Moreover, a bottom edge of the valve cover 2 has a chamfer 23. The outer diameter of the valve cover 2 is slightly greater than the internal diameter of the outer sleeve 7.

Please refer to FIG. 8. In order to assemble the fluid transportation device 1, the valve body 3, the first gasket 9a, the valve membrane 4, the second gasket 9b, the valve chamber seat 5 and the actuator 6 are sequentially stacked, and placed into the accommodation space within the inner wall 71 of the outer sleeve 7, being supported by the annular protrusion structure 72 of the outer sleeve 7. Since the outer diameter of the valve cover 2 is slightly greater than the internal diameter of the outer sleeve 7, the valve cover 2 is tightly fitted with the inner wall 71 of the outer sleeve 7 after the valve cover 2 is introduced into the accommodation space of the outer sleeve 7 by its chamfer 23. Meanwhile, since the valve cover 2 is positioned in the outer sleeve 7, the combination of the valve body 3, the first gasket 9a, the valve membrane 4, the second gasket 9b, the valve chamber seat 5 and the actuator 6 is securely fixed between the valve cover 2 and the outer sleeve 7, whereby the fluid transportation device 1 is assembled. In this embodiment, the actuator 6 is also disposed within the accommodation space of the outer sleeve 7. When the piezoelectric element 62 is subjected to a deformation in response to the applied voltage, the vibration plate 61 is driven to vibrate along the vertical direction in the reciprocating manner, in which the resonance effect and deformation of the piezoelectric element 62 and the vibration plate 61 occur. In other words, it is not necessary to use fastening elements (e.g., screws, nuts or bolts) to fasten and assemble the components of the fluid transportation device 1. The conventional fluid transportation device only uses sealing rings to prevent fluid leakage. In contrast, the fluid transportation device 1 of the present disclosure further comprises the first gasket 9a and the second gasket 9b with the larger contact areas with the valve body 3 and the valve chamber seat 5, so that efficacy of preventing fluid leakage is enhanced. Moreover, assembling the first gasket 9a and the second gasket 9b is easier and faster than assembling the sealing rings.

Please refer to FIG. 8 again. The inlet valve channel 51 of the valve chamber seat 5 is aligned with the inlet opening 311 of the valve body 3, and the inlet valve channel 51 of the valve chamber seat 5 and the inlet opening 311 of the valve body 3 are selectively in communication with each other through the valve plate 41a of the valve membrane 4. When the inlet opening 311 of the valve body 3 is closed by the valve plate 41a, the valve plate 41a is in close contact with the protrusion block 344 of the valve body 3. Consequently, a pre-force is generated to result in a stronger sealing effect, and the fluid will not be returned back. Similarly, the outlet valve channel 52 of the valve chamber seat 5 is aligned with the outlet opening 321 of the valve body 3, and the outlet valve channel 52 of the valve chamber seat 5 and the outlet opening 321 of the valve body 3 are selectively in communication with each other through the valve plate 41b of the valve membrane 4. When the outlet valve channel 52 of the valve chamber seat 5 is closed by the valve plate 41b, the valve plate 41b is in close contact with the protrusion block 534 of the valve chamber seat 5. Consequently, a pre-force is generated to result in a stronger sealing effect, and the fluid will not be returned back to the pressure chamber 55. Under this circumstance, backflow does not occur and the fluid is isolated in the inlet passage 31 and the outlet passage 32 of the valve body 3 while the fluid transportation device 1 is not in action.

Figure 9A:
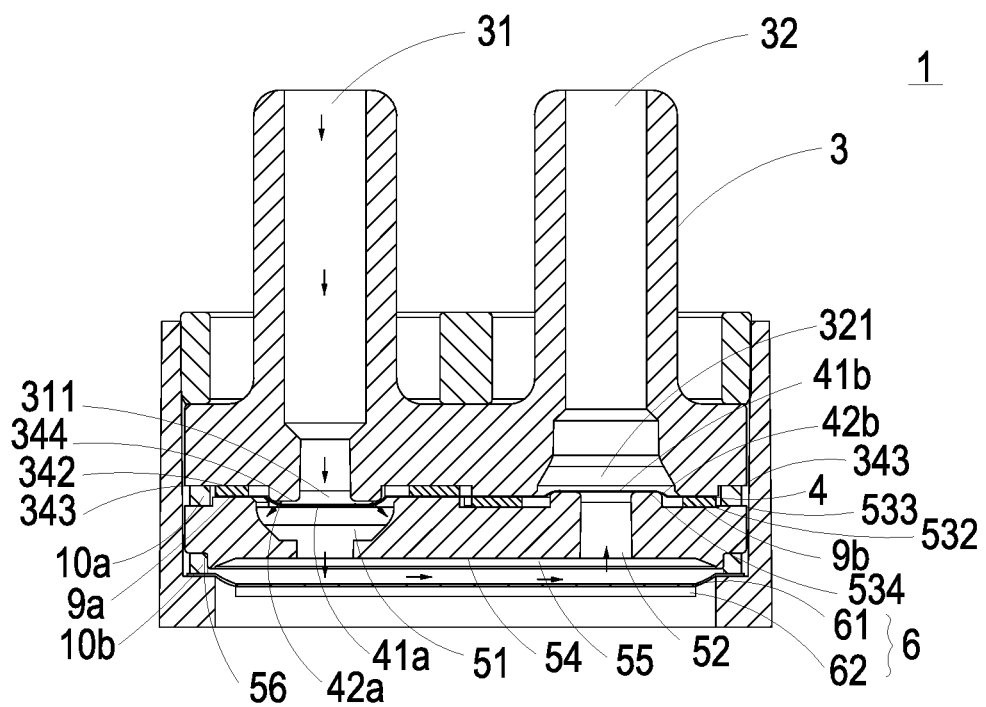
FIG. 9A is a schematic view illustrating the operations of the fluid transportation device in a first situation.

The operations of the fluid transportation device 1 will be described in more details as follows. FIG. 9A is a schematic perspective view illustrating the operations of the fluid transportation device in a first situation. When the piezoelectric element 62 of the actuator 6 is subjected to a deformation in response to the applied voltage and causes downwardly deformation of the vibration plate 61, the volume of the pressure chamber 55 is expanded to result in a suction force. In response to the suction force, the valve plate 41a of the valve membrane 4 is quickly opened. Consequently, a great amount of the fluid is inhaled into the inlet passage 31 of the valve body 3, passing through the inlet opening 311 of the valve body 3, the hollow parts 43a (see FIG. 5) of the valve membrane 4 and the inlet valve channel 51 of the valve chamber seat 5, and transferred to the pressure chamber 55 to be temporarily stored therein. Since the suction force is also exerted on the outlet valve channel 52 at the same time, the valve plate 41b of the valve membrane 4 elastically supported by the extension parts 42b is entirely plastered downwardly to and in close contact with the protrusion block 534 of the valve chamber seat 5 to be tightly closed.

Figure 9B:
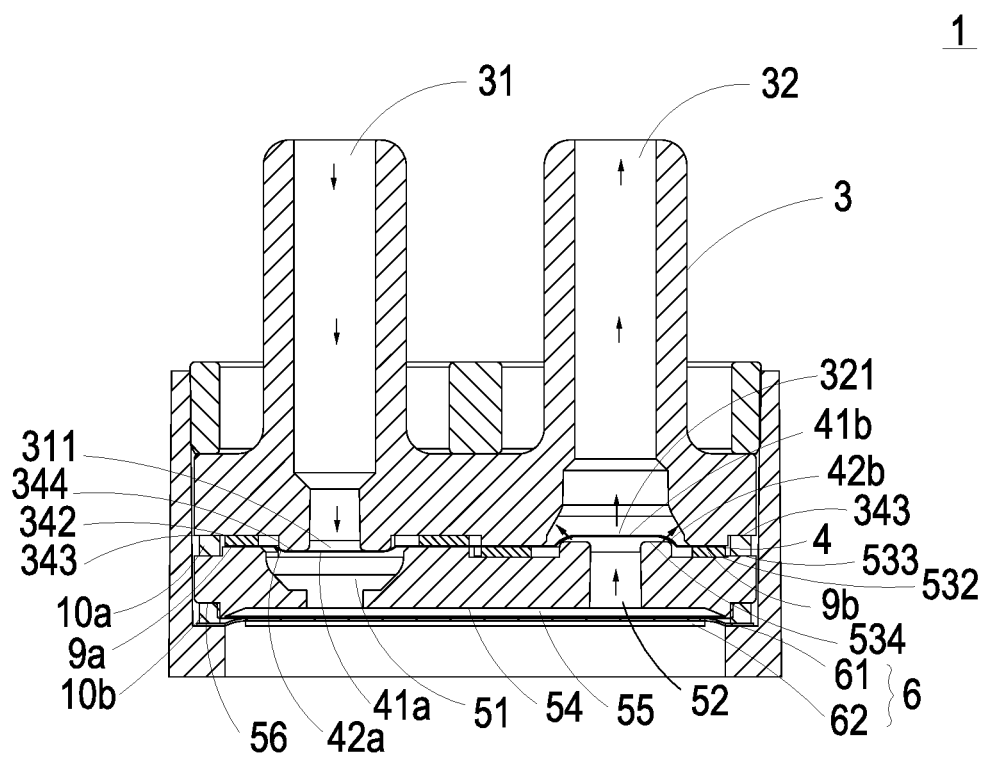
FIG. 9B is a schematic view illustrating the operations of the fluid transportation device in a second situation.
Figure 10A:
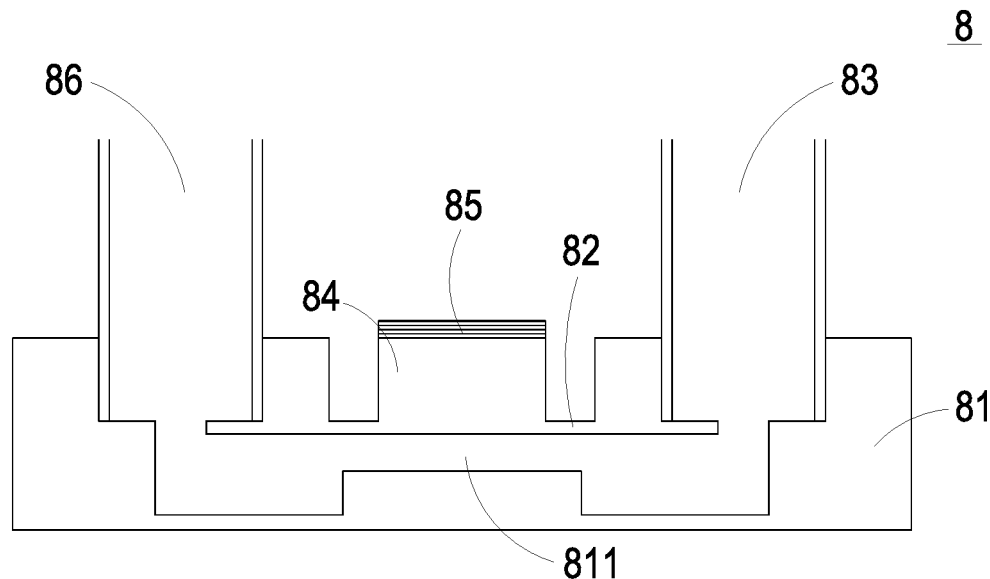
FIG. 10A is a schematic cross-sectional view illustrating a conventional micro pump in a non-actuation status.
Figure 10B:
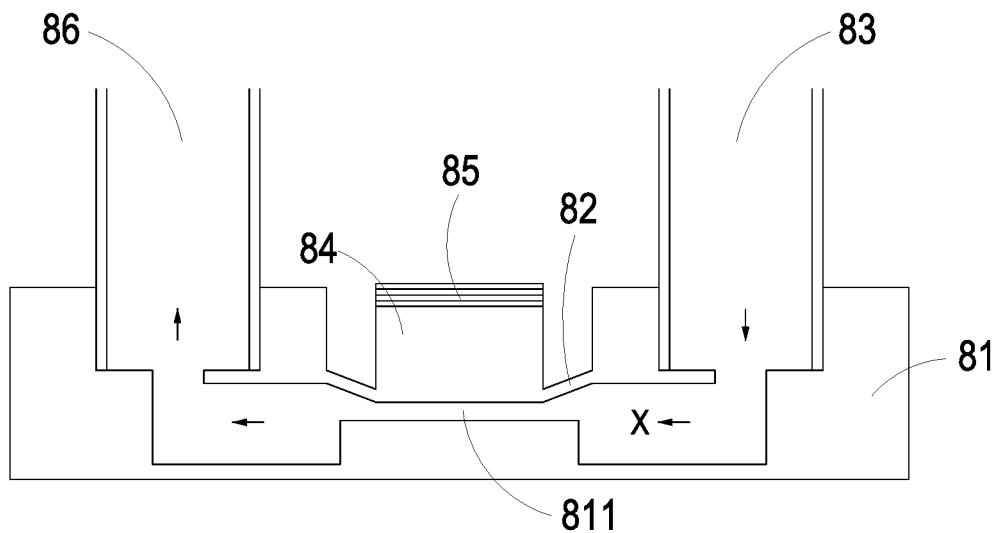
FIG. 10B is a schematic cross-sectional view illustrating the conventional micro pump in an actuation status.
Figure 10C:
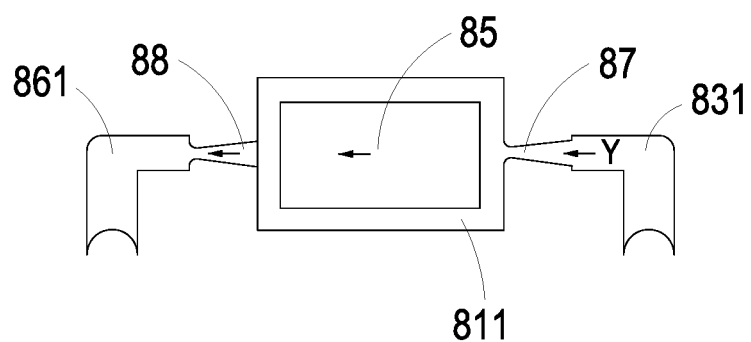
FIG. 10C is a schematic top view of the conventional micro pump shown in FIG. 10A.

Afterwards, as shown in FIG. 9B which is a schematic view illustrating the operations of the fluid transportation device in a second situation, once the direction of electric field which is applied to the piezoelectric element 62 is changed, the piezoelectric element 62 drives vibration plate 61 to deform upwardly, and the volume of the pressure chamber 55 is shrunken. As a result, the fluid within the pressure chamber 55 is compressed, and a pushing force is applied to the internal space of the inlet valve channel 51. In response to the pushing force, the valve plate 41a of the valve membrane 4 elastically supported by the extension parts 42a is entirely plastered upwardly to and in close contact with the protrusion block 344 of the valve body 3 to be closed. Consequently, the fluid in the inlet valve channel 51 is prevented from flowing back. Meanwhile, the pushing force is also applied to the internal space of the outlet valve channel 52. In response to the pushing force, the valve plate 41b of the valve membrane 4 elastically supported by the extension parts 42b moves upwardly and entirely departs from the protrusion block 534 to be open. Consequently, the fluid is discharged from the pressure chamber 55 through the outlet valve channel 52 of the valve chamber seat 5, and transferred to the exterior of the fluid transportation device 1 through the hollow parts 43b (see FIG. 5) of the valve membrane 4, the outlet opening 321 of the valve body 3 and the outlet passage 32 of the valve body 3, sequentially. Hence, the process of fluid transportation is accomplished. The processes of FIGS. 9A and 9B are repeatedly done to continuously transfer fluid. In this way, the fluid transportation device 1 is capable of transferring fluid at high efficiency without backflow.

From the above descriptions, the present disclosure provides the fluid transportation device. After the valve body 3, the first gasket 9a, the valve membrane 4, the second gasket 9b, the valve chamber seat 5 and the actuator 6 are sequentially stacked and placed in the outer sleeve 7, the valve cover 2 is inserted into the outer sleeve 7 from top to assemble therewith and to be tightly fitted with the inner wall 71 of the outer sleeve 7. Consequently, the combination of the valve body 3, the first gasket 9a, the valve membrane 4, the second gasket 9b, the valve chamber seat 5 and the actuator 6 is positioned in the outer sleeve 7, and the assembly of the fluid transportation device 1 is accomplished. In other words, it is not necessary to use the fastening elements (e.g., screws, nuts or bolts) to fasten and assemble the components of the fluid transportation device 1. Without using additional components, the assembly of the fluid transportation device 1 is easier than prior art. Moreover, the disposition of the first gasket 9a, the second gasket 9b, and the sealing rings 10a and 10b, provides an improved sealing effect to the inlet opening 311, the outlet opening 321, the inlet valve channel 51, the outlet valve channel 52, and the edge of the pressure chamber 55, so that fluid leakage therefrom is prevented. In addition, piezoelectrically actuated by the actuator 6, the volume of the pressure chamber 55 is changed by which the valve plates 41a and 41b of the valve membrane 4 are selectively opened or closed. Consequently, the fluid can be transferred by the fluid transportation device 1 at high efficiency with no backflow. In other words, the fluid transportation device 1 has significant improvement in the technical field.

While the disclosure has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A fluid transportation device, comprising:
a valve cover comprising a first opening and a second opening, wherein a bottom edge of the valve cover has a chamfer;
a valve body comprising an inlet passage, an outlet passage, a first surface and a second surface, wherein a first protrusion platform is protruding from the second surface so that a first coupling plane is concavely formed on the second surface, the inlet passage and the outlet passage run through the first surface and the second surface, an inlet opening is formed on the second surface and in communication with the inlet passage, and an outlet opening is formed on the second surface and in communication with the outlet passage;
a valve membrane comprising two valve plates with the same thickness, plural extension parts disposed around each of the valve plates for elastically supporting the valve plates, and a hollow part formed between each two adjacent extension parts;
a first gasket attached on the first coupling plane to be arranged between the valve body and the valve membrane, the first gasket having a first perforation corresponding to the inlet opening;
a valve chamber seat comprising a third surface, a fourth surface, an inlet valve channel and an outlet valve channel, wherein a second protrusion platform is protruding from the third surface so that a second coupling plane is concavely formed on the third surface, the inlet valve channel and the outlet valve channel run through the third surface and the fourth surface, the two valve plates of the valve membrane are respectively supported by the inlet valve channel and the outlet valve channel to form two valve structures thereon, a pressure chamber is concavely formed on the fourth surface, and the pressure chamber is in communication with the inlet valve channel and the outlet valve channel;
a second gasket attached on the second coupling plane to be arranged between the valve membrane and the valve chamber seat, the second gasket having a second perforation corresponding to the outlet opening of the valve body;
an actuator covering and sealing the pressure chamber of the valve chamber seat; and
an outer sleeve comprising an inner wall, an accommodation space surrounded by the inner wall, and an annular protrusion structure formed on the bottom of the inner wall,
wherein the valve body, the first gasket, the valve membrane, the second gasket, the valve chamber seat and the actuator are sequentially stacked and corresponding to each other and accommodated within the accommodation space of the outer sleeve and supported by the annular protrusion structure of the outer sleeve, wherein the inlet passage and the outlet passage of the valve body are respectively penetrating through the first opening and the second opening of the valve cover, and the valve cover is introduced into the accommodation space of the outer sleeve by the chamfer thereof to be tightly fitted with the inner wall of the outer sleeve and to be assembled with the valve body, the first gasket, the valve membrane, the second gasket, the valve chamber seat and the actuator which are sequentially stacked so that the valve cover, the valve body, the first gasket, the valve membrane, the second gasket, the valve chamber seat and the actuator are positioned.

2. The fluid transportation device according to claim 1, wherein the first gasket and the second gasket have the same shape, and a shape of the valve membrane is a combination of the shapes of the first gasket and the second gasket.

3. The fluid transportation device according to claim 2, wherein the first gasket and the second gasket have semi-circular shapes, and the valve membrane has a circular shape.

4. The fluid transportation device according to claim 1, wherein the second surface of the valve body further comprises a first periphery annular region, and the third surface of the valve chamber seat further comprises a second periphery annular region, wherein when the valve body, the first gasket, the valve membrane, the second gasket, and the valve chamber seat are sequentially stacked, an annular groove between the valve body and the valve chamber seat is formed by the first periphery annular region and the second periphery annular region, and a sealing ring is trapped within the annular groove.

5. The fluid transportation device according to claim 1, wherein the valve cover has an outer diameter greater than an internal diameter of the outer sleeve, so that when the valve cover is assembled with the outer sleeve, the valve cover is tightly fitted with the inner wall of the outer sleeve.

6. The fluid transportation device according to claim 1, wherein plural recesses are formed on the second surface of the valve body, and plural posts are formed on the third surface of the valve chamber seat, wherein the plural posts are engaged with the corresponding recesses so that the valve chamber seat is fixed on the valve body.

7. The fluid transportation device according to claim 6, wherein the valve membrane is arranged between the valve body and the valve chamber seat, and the valve membrane comprises plural positioning holes corresponding to the plural posts, wherein the plural posts are penetrating through the corresponding positioning holes for positioning the valve membrane.

8. The fluid transportation device according to claim 6, wherein the first gasket comprises at least one first gasket positioning hole, the second gasket comprises at least one second gasket positioning hole, wherein the first gasket positioning hole and the second gasket positioning hole are corresponding to the posts so that the posts are correspondingly penetrating through the first gasket positioning hole and the second gasket positioning hole for positioning the first gasket and the second gasket.

9. The fluid transportation device according to claim 1, wherein a first protrusion block is formed on the second surface of the valve body and arranged around the inlet opening, and a second protrusion block is formed on the third surface and arranged around the outlet valve channel, wherein the first protrusion block and the second protrusion block are for being respectively in close contact with the two valve plates so that a pre-force is generated to result in a sealing effect to prevent backflow.

10. The fluid transportation device according to claim 1, wherein the actuator comprises a vibration plate and a piezoelectric element, wherein the piezoelectric element is attached on a surface of the vibration plate, the piezoelectric element is subjected to a deformation in response to an applied voltage, and the vibration plate of the actuator is assembled with the fourth surface of the valve chamber seat to cover and seal the pressure chamber.

\* \* \* \* \*